Feb. 27, 1968  A. J. KILEY ET AL  3,371,026
ELECTROLYTIC REDUCTION CELL WITH CRUST-BREAKING
AND ORE FEEDING MEANS
Filed Feb. 4, 1964  3 Sheets-Sheet 1

FIG. I.

INVENTORS
ALLAN JACK KILEY
HARRY T. SHIVER

BY Glenn, Palmer & Matthews

ATTORNEYS

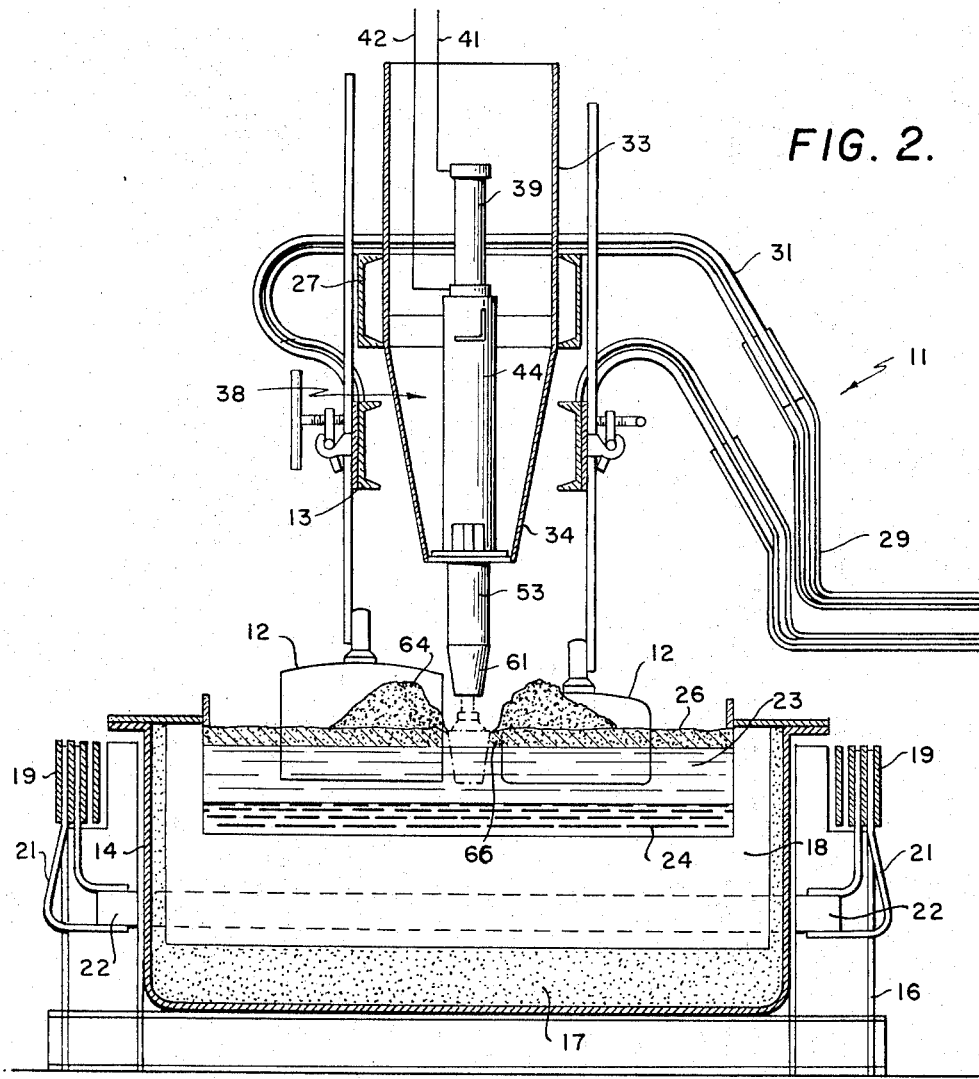
FIG. 2.
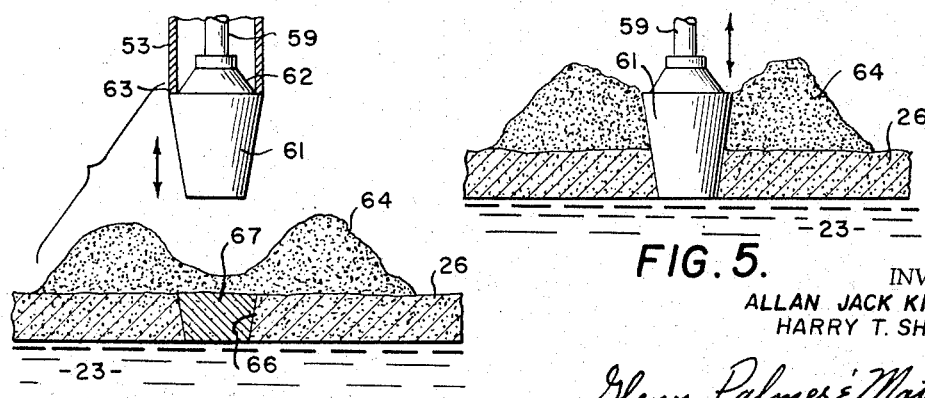
FIG. 4.
FIG. 5.
INVENTORS
ALLAN JACK KILEY
HARRY T. SHIVER
BY Glenn, Palmer & Matthews
ATTORNEYS

INVENTORS
ALLAN JACK KILEY
HARRY T. SHIVER

3,371,026
ELECTROLYTIC REDUCTION CELL WITH CRUST-BREAKING AND ORE FEEDING MEANS

Allan Jack Kiley and Harry T. Shiver, Portland, Oreg., assignors to Reynolds Metals Company, Richmond, Va., a corporation of Delaware
Filed Feb. 4, 1964, Ser. No. 342,388
11 Claims. (Cl. 204—245)

This invention relates to apparatus for feeding alumina to an aluminum reduction cell or pot and more particularly to apparatus for the automatic feeding of alumina to an alumina reduction cell.

Diverse types of alumina or ore feeders are disclosed in the prior art. For instance, the United States Patent 2,245,505 to Siedentopf discloses the use of a tube of graphite extending into the electrolyte as an alumina feeder. It is apparent however that feeders of this type are not practical with present day large capacity, high current alumina reduction cells, particularly of the top-mounted anode type, such as either the Soderberg or prebaked types. Also, United States Patent 2,593,741 to Ferrand illustrates an alumina feeder whereby alumina is fed into the cell bath by means of gas pressure in tubes extending through the carbon anodes. This system introduces foreign gases into the cell whereby losses of expensive fluoride salts by chemical reaction and/or vaporization from the cell are increased.

The United States Patent 2,713,024 to Mantovannelo discloses a complex screw conveyor system situated very close to the crust between the carbons of the prebaked anode or extending down through a Soderberg anode. Pressure is applied to the alumina by means of a screw conveyor and a plunger or compressed gas forces the alumina through the crust into the bath of molten cryolite. The close proximity of the discharge end of the system to a molten bath creates continuous maintenance problems, and the truly continuous ore feeding possible with the expensive screw conveyor system provides no improvement in cell operation over that obtained by simpler means that add ore continuously in discrete batches separated by small, finite intervals of time.

The United States Patent 3,006,825 to Ovram Sem illustrates another attempt at providing an efficient alumina feeder and discloses the use of pot off-gases for conveying, drying and preheating alumina before feeding the alumina into a cylinder, the discharge end of which is buried in the ore cover beside a Soderberg anode. A plunger in the cylinder is operated periodically to maintain a hole in the crust. The cost of installation of this large, extensive system would appear to be prohibitive especially in plants already equipped with a gas-collection system, and means to control the rate of ore addition would have to be provided to prevent cell upsets from overfeeding. Moreover, maintenance costs would be high on the cylinder set in the ore crust and on pumps, valves and pipelines carrying the hot off-gases. Although many attempts have been made previously to provide a simple, efficient alumina feeder as demonstrated by the number of patents disclosing feeder mechanisms of one manner or another, all such systems and devices developed thus far possess serious and practical disadvantages.

Therefore, a principal object of this invention is to provide an improved alumina feeder for use with any type of conventional alumina reduction cells and which may be quickly and economically installed in existing cells.

Another object of the invention is to provide an automatic alumina feeding mechanism for periodically feeding metered batches or "shots" of alumina into an alumina reduction cell bath and wherein the feeder parts contact the crust and bath only momentarily during each feeding cycle.

Still another object of this invention is to provide an automatic alumina feeding apparatus comprising a self-cleaning fluid-operated ram whereby feeding is accomplished with a single stroke for each feeding cycle.

Another object of this invention is to provide an automatic alumina feeding apparatus whereby the alumina may be metered volumetrically and preheated before being fed into an alumina reduction cell.

A further object of this invention is to provide an automatic alumina feeder that is small in size, simple and efficient in operation, which may be readily installed in existing conventional reduction cells, particularly of the prebaked anode type, and which may be readily changed out for repair and maintenance.

An alumina feeder in accordance with the principles of this invention and in contrast to the prior art, possesses numerous advantages in that: the alumina is fed periodically in metered small batches into the cell with less cell sludging and a more even bath temperature than with manual feeding; feeder parts contact the crust only momentarily during each feeding cycle; only a single stroke of a ram is required during each feeding cycle; the feed ram is self-cleaning; alumina is metered volumetrically, and the feeding rate may be regulated in accordance with periodic free-alumina analyses combined with estimates of ore introduction during tapping and anode changes.

An alumina feeder in accordance with this invention results in more stable operating conditions in reduction cells, reduces labor requirements, and provides a significant increase in cell current efficiency. Also, because of the simplicity and compactness of this invention, this feeder is particularly advantageous for use in cells of the prebaked anode type as the feeder may be so positioned in the cell as to give a uniform and rapid dissolution of alumina into the bath. The small size of the feeder allows ready installation between the spaced rows of prebaked anodes. Alumina is supplied to the feeder from an overhead hopper and the assembly is readily and economically installed in conventional cells.

Apparatus for accomplishing these and many other objects will become readily apparent from a reading of a detailed description of a preferred embodiment of the invention when taken in view of the appended drawings wherein:

FIGURE 2 is a transverse sectional view of the cell shown in FIGURE 1 illustrating the manner in which the feeder is centrally positioned between spaced rows of prebaked carbon anodes;

FIGURE 4 is an enlarged sectional view illustrating the feeder ram in a raised position above the cell crust; and FIGURE 5 is an enlarged sectional view illustrating the feeder ram in a lowered position extending through the crust as in a feed stroke.

As is well known in the art, an electrolytic reduction furnace consists essentially of a carbon anode, molten aluminum cathode, and an electrolyte of molten cryolite in which alumina (aluminum oxide, $Al_2O_3$) is dissolved. The overall reaction occurring in the furnace consists in the reduction of alumina to aluminum which is deposited at the cathode, and the oxidation of carbon to its monoxide and dioxide at the anode. For an excellent discussion of the alumina reduction process and alumina reduction cells for carrying out the process, reference may be had to a monograph by T. G. Pearson, entitled "The Chemical Background of the Aluminum Industry," published by the Royal Institute of Chemistry, London, England, as reprinted with minor corrections in September 1957.

Figure 1:
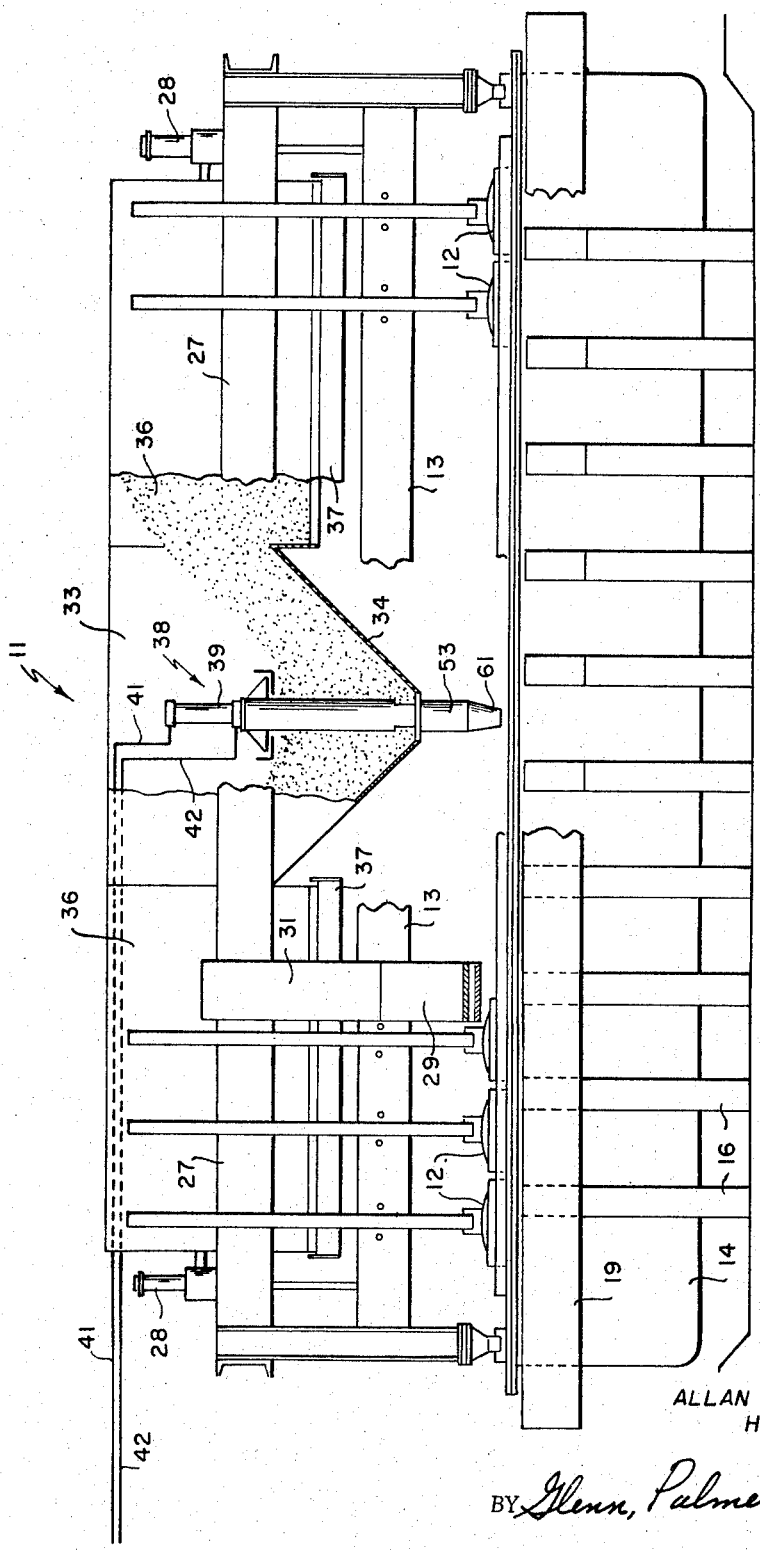
FIGURE 1 is a side elevational view in partial section illustrating an alumina reduction cell of a prebaked carbon anode type and including a centrally positioned automatic alumina feeder in accordance with the principles of this invention.

Referring now to the drawings, FIGURES 1 and 2 illustrate an alumina reduction cell designated generally by the reference numeral 11, having a plurality of prebaked carbon anodes 12 suspended in spaced rows from a movable bridge 13 above a pot or cell 14 lined with a layer of insulating alumina 17 upon which a solid carbon cathode 18 is positioned and connected in electrical circuit with a ring bus 19 by way of flexible connections 21 and collector bars 22 that pass through the carbon cathode 18. A bath 23 of molten cryolite and alumina is maintained within the carbon cathode 18 and as reduction takes place a layer of molten aluminum 24 settles out at the bottom. A crust 26, that may build up to several inches in thickness, covers the bath 23 and surrounds the prebaked carbon anodes 12 that extend through the crust and into the bath.

The movable bridge 13 is vertically adjustable relative to a fixed bridge 27 by means of bridge jacks 28 positioned at either end of the fixed bridge 27 so that all prebaked carbon anodes 12 are simultaneously vertically adjustable. The movable bridge 13 is connected by flexible connections 31, to a low-voltage, high-current capacity riser bus 29 which in turn connects through preceding cells (not shown) to the D.C. current source (not shown).

A continuous, overhead alumina bin, comprising a central hopper 33 having sloped sidewalls 34, and two flat-bottom end hoppers 36 provided with conventional dump gates 37 is supported above the carbon anodes 12 and extends substantially the entire length of the cell 11. Ore is added as needed to the crust 26 in the conventional manner by discharging from end hoppers 36 through dump gates 37. As the hoppers 33 and 36 are interconnected the alumina freely flows into the sloped bottom central hopper 33 from the end hoppers 36, keeping the central hopper charged at all times.

Figure 3:
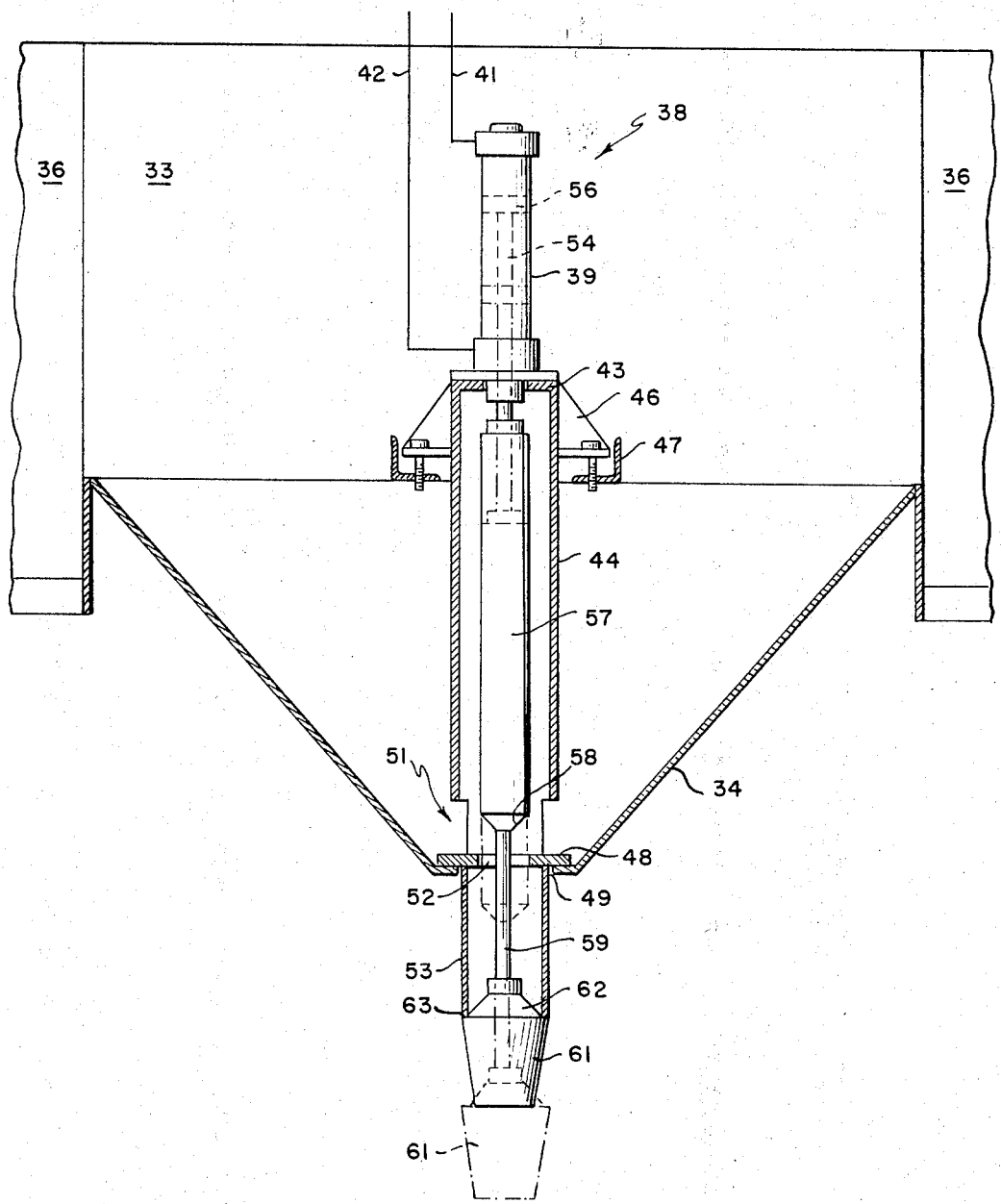
FIGURE 3 is an enlarged sectional view illustrating the feeder in greater detail.

A feeder designated generally by reference numeral 38 for accomplishing the breaking or depression of the cell crust and the feeding of alumina into the bath is supported in the central hopper 33 between the spaced rows of carbon anodes 12 and is shown in greater detail in FIGURE 3. Referring to FIGURE 3, the sidewalls 34 of the central hopper 33 are tapered to a narrow bottom opening so that alumina is fed by gravity from the end hoppers 36 into the central hopper 33. Means, such as slide gates, may be provided if desired for stopping the flow or ore into a region of hopper 33 adjacent the feeder for convenience during feeder change-out. A reversible, double-acting, fluid or air operated cylinder 39 connected to a suitable source of pressure by lines 41 and 42 is affixed to the closed end 43 of, and maintained in proper space relationship to an orifice plate 48 by, a vertically upstanding pipe 44 supported by brackets 46 bolted to angle irons 47 extending across the hopper 33. The pipe 44 is attached to the orifice plate 48 that covers the lower opening 49 of the hopper 33. Portions of the pipe 44 are cut out to form feed openings 51 allowing alumina to flow through a central opening 52 in the orifice plate 48 into an open ended metering chamber 53 of pipe or tubing and of known volumetric capacity.

A piston rod 54, connected to a piston 56, is secured to a valve spool 57 having a tapered shoulder 58 formed thereon. The diameter of the valve spool 57 is slightly less than the diameter of the orifice 52 thereby allowing the valve spool to freely slide through the orifice 52 and substantially close the same. A lower rod 59 extends from the valve spool 57 and carries at the end a tapered breaker foot or ram 61 having a smooth tapered exterior surface. The ram 61 may be formed of smooth finished cast iron and is provided with a tapered crown 62 that terminates in a flat shoulder 63 that extends parallel with and sealingly engages the end of the metering chamber 53 when the ram is raised.

The operation of the alumina feeder can thus be understood by describing the operation of a feed cycle as illustrated in FIGURES 4 and 5, illustrating the raised and lowered positions of the breaker ram 61. As shown in FIGURES 3 and 4 with the piston rod 54 in the up position the valve spool 57 is withdrawn from the orifice 52 allowing alumina to freely flow through the openings 51 into the metering chamber 53 to completely fill the same with a volumetric measurement of powdered alumina. When the air cylinder 39 is pulsed, fluid under pressure is admitted into the cylinder by way of the conduit 41 forcing the piston 56 downwardly, and the valve spool 57 is opened allowing the metered volume of alumina within the pipe to shower down over the tapered crown 62 of the breaker ram 61 falling in a raised ringlike mound 64 on the crust 26 surrounding the breaker ram 61. The raised ring of alumina 64 resting on the crust 26 is formed initially by piling the alumina up at the desired height or is allowed to build up gradually over a period of time by virtue of the operation of the feeder. Because of the inherent physical properties of the powdery alumina, the alumina is free from caking and pours easily. When the breaker ram 61 is withdrawn through the hole 66 in the crust to the raised position the alumina slides into the hole 66 to form a wedge, shot or charge 67 of alumina containing a substantially constant, metered volume. The volume of alumina in the charge 67 is determined by the volume of alumina contained in the metering chamber 53 and deposited in the ring mound 64 during the previous feed stroke.

As the breaking ram 61 engages and forces the alumina charge 67 into the molten electrolyte bath 23, the alumina in the mound 64 fills in around the breaker ram 61, as shown in FIGURE 5. Because the charge 67 is formed adjacent the bath 23 and the hot crust 26 and insulatingly protected by the mound 64, it accumulates heat during allotted time between downstrokes of the piston 56 thereby being preheated and made more readily dissolvable before being forced into the bath 23 by the succeeding feed stroke. The smooth finish of the breaker ram 61 makes it self-cleaning as cryolite that may freeze on the ram surface breaks away during cooling in the period between downstrokes. As the breaker ram 61 is in contact with the crust and molten bath only periodically and for short durations, it is not subject to corrosion and wear and maintains a sealing engagement with the metering chamber 53 when in the raised position. The length of stroke of the breaker ram may be made variable if desired, and the feed cycle may be set for any determined period utilizing conventional switches and circuitry for pulsing the air cylinder 39.

Although a preferred embodiment of the invention has been described as a single feeder employed in a multiple prebaked carbon anode alumina reduction cell, two or more feeders may be employed in one cell, if desired. Further, the feeder is not restricted to use with a prebaked carbon anode cell but may be employed with Soderberg and other top-mounted anode alumina reduction cells. It is apparent, therefore, that numerous modifications and alterations may be made in the invention without departing from the spirit and scope thereof which is to be limited only by the scope of the appended claims.

What is claimed is:

1. An automatic ore feeder comprising a hopper, an orifice plate at the bottom of said hopper, an orifice in said plate, a first pipe within said hopper supported on said orifice plate above the orifice, cutouts in said first pipe at the lower end thereof, a second pipe carried by the underside of said orifice plate, a breaker foot normally closing the lower end of said second pipe thereby defining a calibrated chamber, a lower rod connected to said breaker foot and extending upwardly into said second pipe, a valve member within said first pipe connected to the upper end of said lower rod adapted to just pass through said orifice, an upper rod connected to the upper end of said valve member, and a selectively operable means connected to said upper rod for actuating said upper rod, valve member, lower rod, and breaker foot.

2. In an electrolytic reduction cell of the prebaked carbon anode type wherein a plurality of prebaked carbon anodes are suspended in spaced rows and extending in the cell crust and bath substantially along the entire length of said cell, the improvement comprising an overhead alumina bin extending between said spaced rows of carbon anodes, said bins including a central hopper having a sloped narrowing bottom provided with a lower opening and end hoppers on either side of and communicating with said central hopper whereby alumina freely flows into said central hopper; said end hopper being provided with gates for feeding alumina to the crust of said cell; an orifice plate in the lower opening of said central hopper; an open-ended metering chamber extending below said orifice plate and communicating with said central hopper; vertically reciprocal valve means for opening and closing said orifice; a breaker foot secured to said valve means for closing said open-ended metering chamber when said valve member is in an up position and said orifice is open whereby a metered quantity of alumina is received in said metering chamber, and for opening said metering chamber when said valve means is in a down position and said orifice is closed; whereby a metered quantity of alumina is deposited on the crust of said cell and said breaker foot is thrust into said crust to force a previously deposited and metered quantity of alumina into said bath; and means for reciprocating said valve means at determined intervals.

3. A device as defined in claim 2 including slide gates for separating said central hopper from said end bins.

4. A device for feeding alumina through the crust of an electrolytic reduction cell for the production of alumina comprising:
  a hopper for storing alumina;
  means for supporting said hopper above said crust of said reduction cell;
  an orifice at the bottom of said hopper;
  an open-ended metering chamber extending below said orifice;
  vertically reciprocable valve means for opening and closing said orifice;
  means for reciprocating said valve means;
  a breaker foot having a closing portion and a crust breaking portion, said breaker foot secured to said valve means and reciprocable therewith to close the open end of said metering chamber when in an upper position and to open the metering chamber and break said crust when in a lower position, whereby said metering chamber is alternately filled with and emptied of alumina when said valve means and said breaker foot are in said upper and lower position respectively.

5. The apparatus of claim 4 including a pipe disposed above said orifice and surrounding said reciprocable valve member, said pipe having cut-outs in the lower end thereof permitting the passage of alumina from the hopper through said orifice when said valve member is in its uppermost position.

6. The apparatus of claim 5 including fluid pressure means for reciprocating said valve and breaker foot means.

7. The apparatus of claim 4 including fluid pressure means for reciprocating said valve and breaker foot means.

8. The apparatus of claim 4 wherein said valve means has a portion thereof of such size as to pass through said orifice to effect a substantial closure thereof when said valve means is in said lower position.

9. The apparatus of claim 4 wherein said crust breaking portion of said breaker foot has inwardly tapering sides.

10. The apparatus of claim 4 wherein said breaker foot includes an inwardly tapering crown portion.

11. The apparatus of claim 4 including:
  a pipe disposed above said orifice and surrounding the reciprocable valve member, said pipe having cut-out adjacent the lower end thereof permitting the passage of alumina from the hopper through said orifice when said valve member is in its uppermost position; and
  a fluid pressure means for reciprocating said valve and breaker foot members; and wherein:
  said valve means has a portion thereof of such size as to pass through said orifice to effect a substantial closure thereof when said valve means is in said lower position; and
  said crust breaking portion of said breaker foot has inwardly tapering sides at its lower end and an inwardly tapering crown at the upper end thereof.

References Cited

UNITED STATES PATENTS

| | | | |
|---|---|---|---|
| 2,122,216 | 6/1938 | Seawell | 222—365 |
| 3,090,744 | 5/1963 | Muller et al. | 204—243 |
| 3,186,927 | 6/1965 | Mantovanello | 204—245 XR |
| 3,216,918 | 11/1965 | Duclaux | 204—245 |

HOWARD S. WILLIAMS, *Primary Examiner.*

JOHN H. MACK, *Examiner.*

D. R. VALENTINE, *Assistant Examiner.*